ELECTRO-OPTICAL SWITCHING DEVICE USING TWO PHOTOSENSITIVE CELLS WITHIN AN OPAQUE HOUSING

Filed April 25, 1961

INVENTOR.
ROBERT M. GOODMAN

BY

Nelson E. Kimmelman

ATTORNEY

United States Patent Office 3,289,002 Patented Nov. 29, 1966

3,289,002

ELECTRO-OPTICAL SWITCHING DEVICE USING TWO PHOTOSENSITIVE CELLS WITHIN AN OPAQUE HOUSING

Robert M. Goodman, 200 E. Township Line Road, Elkins Park, Pa.

Filed Apr. 25, 1961, Ser. No. 105,465
5 Claims. (Cl. 250—209)

This invention relates to a novel electronic device and in particular to an electro-optical device useful as a switch, relay or amplifier.

Devices are known which comprise a photo-sensitive device placed near a light source in a light-tight enclosure. The light source may consist of a gas discharge tube, for example, which is energized by an input signal. The photo-sensitive device may be a photo-conductive cell, for example, which is connected to an external circuit and whose resistance is caused to vary as a function of the intensity of the light from the light source. These prior art devices have been used as relays, commutators, resistance-varying devices, light choppers, etc., and are characterized by relatively good isolation of the input from the output signal, no moving parts, low insertion losses, minimal microphonic tendencies and relatively long life.

There are many applications which require a more complex type of switch than can be obtained by using only a single photoconductive device and a light source.

It is accordingly an object of my invention to provide a device which can function in a diversity of ways for switching purposes.

Another object of my invention is to provide an electro-optical device with no moving parts in which the input is completely isolated from the output and which can be used for a number of switching applications.

Another object of the invention is to provide electro-optical device whose input and output are isolated and which can be used for a diversity of switching operations.

In accordance with my invention I provide within a light-tight enclosure two photosensitive devices, each of which is adapted to be connected to an external circuit. Between these two devices I provide at least one light source for emitting light that falls on both of the photosensitive devices. The light source is connected to an external circuit and is energized by an input signal which may be of the on-off type or may be a modulated type. In one form of the invention, the light source is connected to leads which pass through apertures in a member positioned intermediate the cells, the inner surface of this member being coated with a reflective material for enhancing the efficiency and sensitivity of the device.

Figure 1:
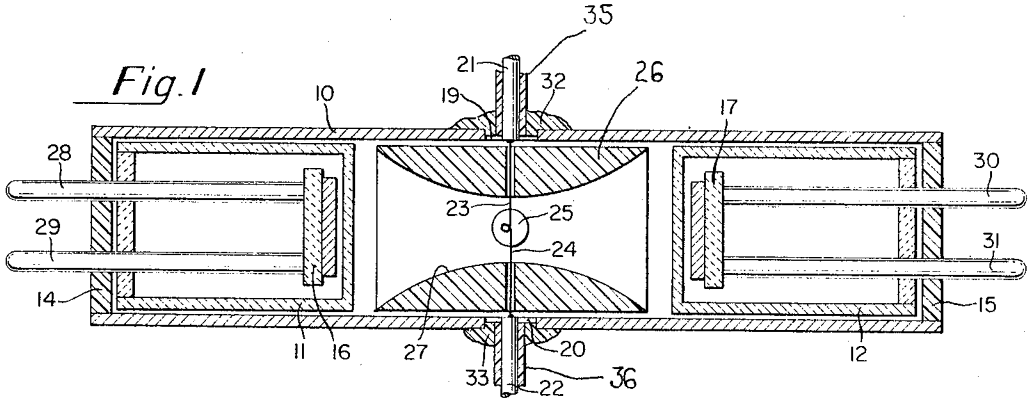
FIGURE 1 is a side elevation sectional view of a device constructed in accordance with my invention.

Referring to FIGURE 1, two photoconductive cells 11 and 12 are disposed within a tubular member 10, which may be made of metal, if desired, for electrical or magnetic shielding purposes, for example, or non-metallic so long as it is opaque. The ends of the tube 10 are sealed off by beads 14 and 15 of sealing materials such as "Apiezon W" which is a hard black wax distributed by James G. Biddle Company of Philadelphia, Pennsylvania. Through the beads 14 and 15 pass the pairs of leads 28, 29 and 30, 31 respectively of the cells 11 and 12. The cells 11 and 12 may be identical and may be, for example, Type CL604L cells manufactured and sold by the Clairex Corporation of New York. These cells have toward their ends substrates 16 and 17 coated with a photoconductive material such as cadmium selenide (CdSe) which are in series with their respective pairs of leads 28, 29 and 30, 31.

Insulating sleeves 35 and 36 pass through apertures 19 and 20. Conductive terminals 21 and 22 pass through sleeves 35 and 36 and are connected, as by soldering, to leads 23 and 24 of a miniature light source such as the sub-miniature incandescent, "Pinlite" brand manufactured by Kay Electric Company. The leads 23 and 24 pass through apertures in a somewhat cylindrical member 26 which has concave portions, symmetrically disposed about its transverse axis. The hollowed-out surface 27 is coated or painted white, for example (or silvered), to reflect light from the source 25 toward the cells. To seal the apertures 19 and 20 against the entrance of ambient light and to help hold the terminals 21 and 22 in place, wads 32 and 33 of an opaque sealant such as the aforesaid "Apiezon W" may be inserted around the terminals and in the said apertures. The tubular member 10 may be made of brass if desired. The whole assembly can have dimensions, for example, such as 1⅜" long and an overall diameter of .281".

The present invention may be used in a number of switching configurations, several of which will now be explained.

Figure 2:
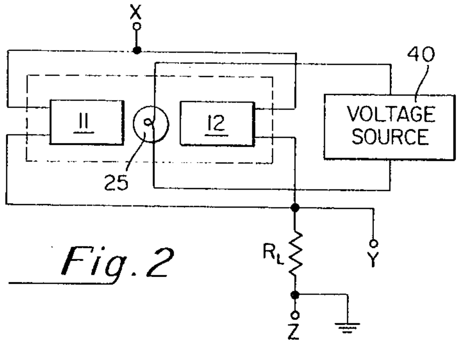
FIGURES 2–5 depict switching applications of my device.

FIG. 2 shows a configuration in which both of the cells 11 and 12 are connected in parallel and are in series with a load resistor $R_L$, the entire series circuit being connected between terminals X and Z, the latter being the common connection. The output is taken across $R_L$ via terminals Y and Z. An input signal is provided by a source 40 which may be either an A.C. or D.C. source which is connected across the leads of the light 25. It will be seen that when the source 25 is lit, current can flow through both cells 12 and 11 from terminal X through $R_L$ to terminal Z thereby generating an output voltage across $R_L$. Thus, if one is limited by low power dissipation cells, the use of two cells enables them collectively to have greater current carrying capacity. Since they are in parallel their combined resistance is lowered so that a greater output voltage may be obtained across $R_L$.

Figure 3:
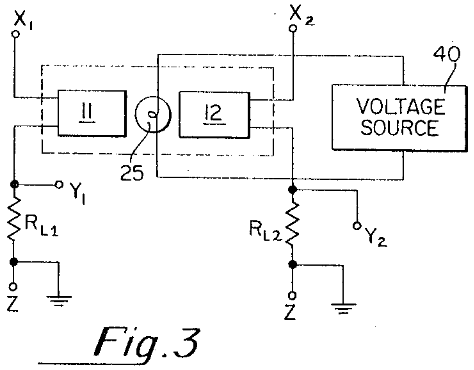

FIGURE 3 shows a different configuration which is equivalent to a double-pole, single-throw switch. When the source 40 energizes the bulb 25 conductivity is established in the two discrete circuits which comprise, respectively cell 11 and $R_{L1}$ in series between terminals $X_1$ and Z and cell 12 and $R_{L2}$ in series across terminals $X_2$ and Z. In each case the outputs are taken across the load resistor $R_{L1}$ and $R_{L2}$.

Figure 4:
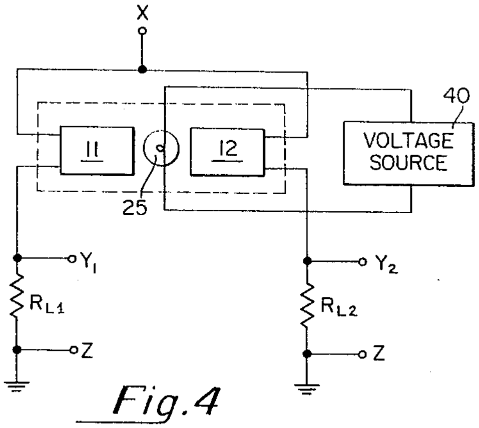

FIGURE 4 illustrates a type of switch which has no conventional appellation but which I shall call a "branching output switch." The cells 11 and 12 have one terminal X in common, each of the other leads being connected across load resistors $R_{L1}$ and $R_{L2}$ and terminal Z. The input as in the former cases, is supplied from a source 40 across the light 25 and outputs are taken across the respective load resistors $R_{L1}$ and $R_{L2}$. Thus, with a single input between terminal X and Z, energization of the light 25 splits the output into two separate paths via the separate load resistors.

Figure 5:
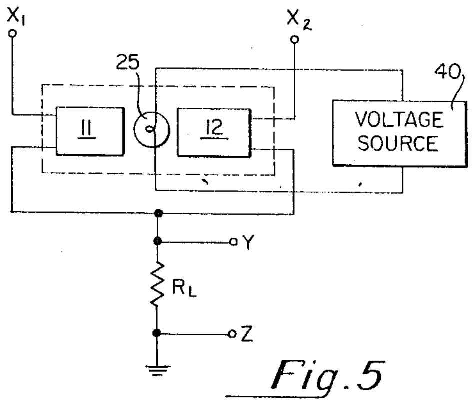

The converse of the previous switching set-up which is a combining output switch is shown in FIG. 5. Again, the cells 11 and 12 have one common terminal Y to which a single load resistor $R_L$ to ground is connected. Each of the leads of the two cells is connected to a different input terminal $X_1$ and $X_2$ to which two different signals may be applied. Energization of the light source 25 by the source 40 therefore causes both of the signals at $X_1$ and $X_2$ to be combined in the output across the common load resistor $R_L$.

Figure 6:
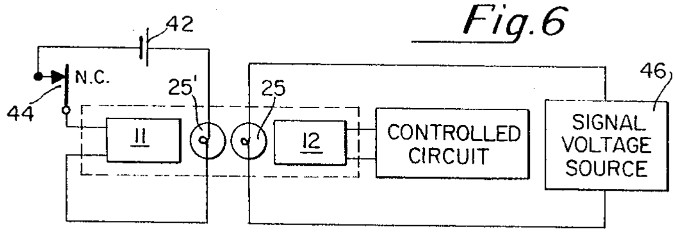
FIGURE 6 is a schematic of a latching circuit which embodies another form of device constructed according to my invention.

The invention has utility in a "latching" circuit such as the one shown in FIG. 6 wherein it is seen that two lamps 25 and 25′ are provided instead of just one. The extra lamp 25′ is connected in series with the leads of cell 11, a voltage source 42 and a normally closed switch 44. The lamp 25 is connected to an external signal voltage source 46 which provides a short pulse on the happening of a given event. As soon as the lamp 25 lights momentarily, both cells 11 and 12 have their resistance reduced greatly. Since cell 11 is in series with lamp 25′ and since switch 44 is normally closed, lamp 25′ will light up and remain on once it has been turned on, even if lamp 25 should subsequently be extinguished. Since lamp 25′ stays on, it will also keep cell 12 at low resistance so that the circuit controlled by the latter will continue to be actuated. To "unlatch" the circuit, the switch 44 is momentarily opened thereby turning off lamp 25′ and causing the resistance across cell 11 to go to its "dark" state level. Naturally, as soon as lamp 25′ goes off, the circuit in which cell 12 is located will also cease functioning.

Still other arrangements of this device are possible as by using, for example, several light sources emissive of different colored lights and cells responsive only to selected colors or combinations of colors. For example, the cells could have in front of their resistive areas filters having mutually exclusive wavelength transmission characteristics and two lamps could be used having corresponding emission characteristics. Alternatively, one of the cells could have a filter which passed a combination of two wavelengths, the other could be arranged to respond only to one of the two wavelengths and the lamp could respectively emit radiation only having the two wavelengths. Thus, if only one lamp were lit it would excite the cell responsive to the combination of wavelengths and also excite the other cell if the latter's characteristics matched. If the other of the two lamps were lit it would excite the cell responsive to the combination also, and the other cell if the latter's characteristics matched. If both lamps were lit they would excite the combination cell and also the other cell. As a variant of this scheme, the combination cell could be arranged in a controlled circuit in such a way that its resistance would not provide an actuating effect until it reached a value produced by the simultaneous illumination of both lamps.

While the invention has been explained in terms of visible light it should be apparent that it works equally well with invisible radiation such as infra-red or ultraviolet rays. In this case, the radiation sources, of course, would emit such rays and the cells would have to be responsive to such radiation.

Also, while the cells described herein are discrete units, they could, in the circuit shown and elsewhere, be embodied in a single structure so long as there were a plurality of photoconductive areas with separate leads brought out for them (except where they can have a common junction as in FIGS. 2, 4 and 5).

Still other combinations of one or more lamps with a plurality of cells having selected emission and transmission characteristics are possible and will be apparent to those skilled in the art. In any case, other embodiments, and applications will occur to those skilled in the art without departing from the essence of my invention as set forth in the following claims:

I claim:

1. An electro-optical device comprising: first and second photoconductive cells having photo-sensitive areas disposed toward the respective ends thereof, said cells being coaxially aligned with said ends having said photosensitive areas facing one another, tubular means surrounding said cells and being substantially coaxial therewith, means between said photosensitive areas having an axial aperture therethrough, and incandescent means disposed in said aperture and constructed to emit light onto both of said areas, said apertured means having said aperture larger at opposite ends thereof and decreasing toward the center thereof, the inner surfaces of said apertured means being substantially reflective of said light, said tubular means being opaque to said light and also being provided with apertures, conductors passing through said apertures to permit application of potentials to said incandescent means and to said cells, seals in said apertures and around said conductors to prevent the passage of ambient light therethrough.

2. A circuit comprising, in combination: an electro-optical device which includes first and second photoconductive cells and first and second sources of radiant energy to which said cells are responsive, said device including a housing which surrounds said cells and said sources, said housing being substantially opaque to said radiant energy, said sources and said cells being arranged so that radiant energy from both of said sources falls on both of said cells, said device also including means for applying electrical potentials through said housing to said cells and to said sources, said first cell being arranged in circuit with an energizing source therefor and said first source of radiant energy, said second source of radiant energy being arranged in circuit with a source of an input signal, and said second cell being arranged in a circuit to be controlled in response to changes in conductivity of said second cell, and means for opening the circuit in which said first cell and said first source are located.

3. A circuit comprising in combination: an electro-optical device which has first and second photoconductive cells whose sensitive areas substantially confront one another, first and second sources of light to which said cells are responsive disposed between the first and second cells, the light from both of said sources being capable of falling upon both of said cells, and a substantially opaque housing surrounding said cells and said sources, said housing including means for applying potentials to said cells and said sources; a source of power for said first light source, a switch, said first cell, first light source, power source and switch being arranged in a series circuit; said second light source being connected in circuit with a source of an input signal; and said second cell being connected to a circuit designed to be responsive to changes in the conductivity of said second cell.

4. An electro-optical device comprising:

(a) an elongated housing constructed to prevent the entrance of visible light to the interior thereof, (b) first and second coaxial photoconductive cells disposed opposite one another having respective face-to-face photo-sensitive areas responsive to visible light, (c) an incandescent assembly for producing visible light which falls upon all of said areas, said assembly being constructed to produce a plurality of selected levels of said light in response to the application of a varying electrical potential thereto, said assembly and said cells being mutually disposed to provide respectively equal and constant paths for said light from said assembly to each of said cells, (d) means between said areas to which said incandescent assembly is mounted, said mounting means having inner surfaces which reflect visible light, said incandescent means being disposed within said mounting means and including conductive means which extend through said mounting means and through the portion of said housing which surrounds the latter means for coupling said incandescent assembly to a source of electrical energy.

5. The device according to claim 4 wherein said incandescent assembly includes a visible light-transparent envelope and two conductive means extending coaxially therefrom in opposite directions and through aligned apertures in said mounting means and in said housing portion.

References Cited by the Examiner

UNITED STATES PATENTS

| | | | |
|---|---|---|---|
| 1,345,586 | 7/1920 | Coblentz | 250—221 |
| 2,208,147 | 7/1940 | Eisler | 250—228 X |
| 2,501,599 | 3/1950 | Eltenton et al. | 250—218 |
| 2,872,590 | 2/1959 | Leavens | 250—208 X |
| 2,895,373 | 7/1959 | Eyraud | 88—14 |
| 2,967,947 | 1/1961 | Flook | 250—219 |
| 2,997,596 | 8/1961 | Vize | 250—209 |
| 3,062,961 | 11/1962 | Kalns et al. | 250—209 X |
| 3,102,227 | 8/1963 | De Gier | 250—209 X |

RALPH G. NILSON, *Primary Examiner.*

WALTER STOLWEIN, *Examiner.*